United States Patent [19]
Fleck et al.

[11] 3,891,632
[45] June 24, 1975

[54] TRIAZOLYLSTYRYL COMPOUNDS

[75] Inventors: Fritz Fleck, Bottmingen, Basel Land; Hans Rudolf Schmid, Riehen, Basel Stodt, both of Switzerland

[73] Assignee: Sandoz Ltd., Basel, Switzerland

[22] Filed: Mar. 28, 1973

[21] Appl. No.: 345,677

Related U.S. Application Data

[63] Continuation-in-part of Ser. No. 41,055, May 27, 1970, abandoned.

[30] Foreign Application Priority Data
June 6, 1969 Switzerland.................... 8647/69
June 11, 1969 Switzerland.................... 8889/69

[52] U.S. Cl.......... 260/240 D; 106/176; 117/33.5 T; 252/301.2 W; 252/543; 260/75 NK; 260/77.5 R; 260/78 R; 260/88.7 R; 260/89.3 L; 260/92.8 R; 260/93.5 R; 260/94.9 GC; 260/141; 260/240.9; 260/307 D; 260/308 A

[51] Int. Cl............................................ C09b 23/14

[58] Field of Search...................... 260/240.9, 240 D

[56] References Cited
UNITED STATES PATENTS

| | | | |
|---|---|---|---|
| 3,635,959 | 1/1972 | Di Giovanoel et al.......... | 260/240 D |
| 3,637,672 | 1/1972 | Seino et al...................... | 260/240.9 |
| 3,637,673 | 1/1972 | Okubo et al..................... | 260/240.9 |
| 3,757,011 | 9/1973 | Fleck et al...................... | 260/240.9 |

FOREIGN PATENTS OR APPLICATIONS

| | | | |
|---|---|---|---|
| 1,273,478 | 5/1972 | United Kingdom............ | 260/249 C |

OTHER PUBLICATIONS

Chemical Abstracts, vol. 66, p. 9921, abst. no. 105,896n, (1967) (Abst. of Japanese Patent 91991/66).

*Primary Examiner*—John D. Randolph
*Attorney, Agent, or Firm*—Gerald D. Sharkin; Richard E. Vila; Joseph J. Borovian

[57] ABSTRACT

Triazolylstyryl compounds of formula

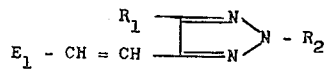

wherein
 $R_1$ is hydrogen, lower alkyl or aryl,
 $R_2$ is optionally substituted aryl,
 $E_1$ is optionally substituted 4-(benzoxazolyl-2′)-phenyl, 4-(naphthoxazolyl-2′)-phenyl or (2′-phenyl-triazolyl-4′)-styryl.

12 Claims, No Drawings

TRIAZOLYLSTYRYL COMPOUNDS

This Patent application is a Continuation in Part of the Pat. application Ser. No. 41,055 filed May 27, 1970 and now abandoned.

The invention relates to triazolylstyryl compounds of formula

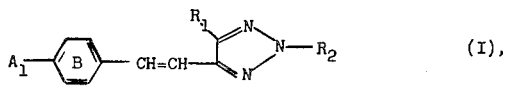

where $A_1$ stand for one of the radicals

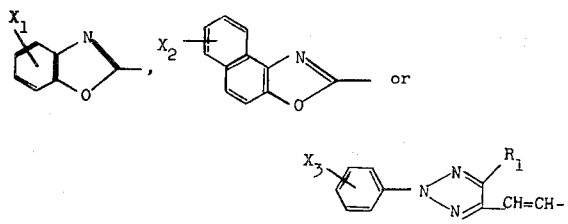

$R_1$ stands for hydrogen, alkyl with 1–6 carbon atoms, which may bear as substituents hydroxy, halogen or alkoxy with 1–6 carbon atoms, or phenyl, which may bear as substituents halogen, nitrile, alkyl or alkoxy with 1–6 carbon atoms, phenyl; the sulphonic or carboxylic group or the sulphonic or carboxylic amide group, $R_2$ stands for a phenyl or naphthyl radical, which may be substituted, $X_1$ stands for hydrogen, halogen, alkyl or alkoxy with 1–6 carbon, atoms, or a phenyl, naphthyl, phenoxy or phenylalkyl radical which may be substituted and in which alkyl is of 1–6 carbon atoms, $X_2$ stands for hydrogen or alkyl with 1–6 carbon atoms, $X_3$ stand for hydrogen, halogen or alkyl or alkoxy with 1–6 carbon atoms and the ring B may bear a substituent, provided that the substituents of the ring B and of phenyl radicals occurring in $R_2$ and $X_1$ are selected from the following: alkyl or alkoxy with 1–6 carbon atoms, halogen, nitrile, unsubstituted or substituted phenyl or phenoxy, carboxylic or sulphonic acid, carboxylic or sulphonic acid phenyl, substituted phenyl or optionally substituted alkyl ($C_{1-6}$) ester, carboxylic or sulphonic acid amide, optionally substituted phenylsulphonyl, alkylsulphonyl with 1–6 carbon atoms, where alkyl may bear as substituents hydroxy, halogen or alkoxy with 1–6 carbon atoms and phenyl and phenoxy may bear as substituents alkyl ($C_{1-6}$), alkoxy ($C_{1-6}$) or halogen; and that the amides derive from amines of formula $$H-N\begin{smallmatrix}R'\\R''\end{smallmatrix}$$

where R' stands for hydrogen, alkyl with 1–6 carbon atoms, hydroxyalkyl with 2–4 carbon atoms, alkoxyalkyl with 3–6 carbon atoms, phenyl, methylphenyl, halogenphenyl, methoxyphenyl or phenylalkyl where alkyl is of 1–6 carbon atoms and R'' stands for hydrogen, alkyl with 1–6 carbon atoms or hydroxyalkyl with 2–4 carbon atoms.

If $R_1$ stands for substituted phenyl, the substituent is preferably in para-position e.g. p-chlorophenyl or p-methylphenyl, the phenyl radical is however preferably unsubstituted. If $R_1$ stands for alkyl this is preferably linear and of low molecular weight. Most preferably $R_1$ stands for hydrogen or methyl.

The substituents which the benzene nucleus B may bear include phenylsulphonyl, methylphenylsulphonyl and chlorophenylsulphonyl groups; phenyl or phenoxy radicals optionally substituted by lower alkyl or alkoxy groups or by halogen atoms, where alkyl has preferably 1 to 6 carbon atoms; further as preferred substituents lower alkyl or alkoxy groups, halogen atoms (bromine, chlorine, fluorine), the cyano, carboxylic acid and sulphonic acid groups and carboxylic acid amide, carboxylic acid ester, sulphonic acid amide, sulphonic acid ester and alkylsulphonyl groups which may be further substituted, where alkyl contains preferably 1 to 6 carbon atoms. The aforestated lower alkyl and alkoxy groups may contain, e.g. 1 to 6 carbon atoms (methyl, ethyl, n-propyl, iso-propyl, n-butyl, isobutyl, tert.butyl, n-amyl, tert.amyl, iso-amyl, sec.amyl, n-hexyl, methoxy, ethoxy, n-butoxy). The carboxylic acid and sulphonic acid ester groups are preferably alkyl ester groups with 1 to 6 carbon atoms (methyl to hexyl as mentioned above) or phenyl or 4-methylphenyl ester groups and may be substituted e.g. by lower alkoxy groups or halogen atoms (2-chlorethyl, 2-methoxyethyl, 2-ethoxyethyl, 2-n-butoxyethyl, 3-methoxypropyl, 3-chloro- or 4-chlorophenyl, 2- or 4-methoxyphenyl). The carboxylic acid and sulphonic acid amide groups may be unsubstituted ($-CO-NH_2$ or $-SO_2-NH_2$) or substituted by alkyl groups with 1 to 6 carbon atoms [(-Z—NH—CH$_3$, —Z—N(CH$_3$)$_2$, —Z—NH—C$_2$H$_5$, —Z—N(C$_2$H$_5$)$_2$, —Z-NH—C$_4$H$_9$-n, -Z—NH-C$_5$H$_{11}$-n, where -Z-denotes -CO- or —SO$_2$ -], hydroxyalkyl groups with 2 to 4 carbon atoms [—Z—NH—C$_2$H$_4$—OH, —Z—N(C$_2$H$_4$OH)$_2$, —Z—NH—CH$_2$-CHOH—CH$_3$, —Z—NH—CH$_2$-CH$_2$—CH$_2$—OH, where —Z- denotes —CO-or —SO$_2$-], alkoxyalkyl groups with at all 3 to 6 carbon atoms (—Z—NH—C$_2$H$_4$—O—CH$_3$, —Z—NH—C$_2$H$_4$—O—C$_4$H$_9$n, —Z—NH—C$_3$H$_6$-OCH$_3$, —Z—NH-C$_2$H$_4$-O-C$_2$H$_5$, —Z—NH—C$_4$H$_8$—O—CH$_3$, where —Z— denotes —CO— or —SO$_2$—), phenylalkyl groups

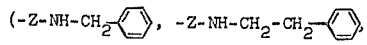

where —Z— denotes —CO— or —SO$_2$), mononuclear aryl groups

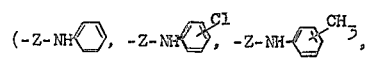

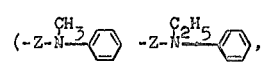

where —Z— denotes —CO— or —SO$_2$— and methyl, methoxy and chlorine stand in one of the ortho-, meta- or para-positions) or by alkyl and phenyl groups

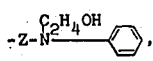

where —Z— denotes —CO— or —SO$_2$—).

The radical R$_2$ may be a radical of the naphthalene or preferably the benzene series and may bear independently of the benzene nucleus B the same substituents as mentioned for the benzene nucleus B.

Especially interesting triazolylstyryl compounds of formula (I) are of formula

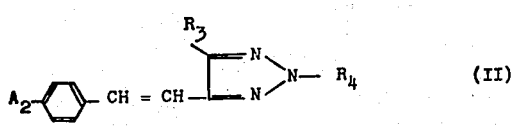 (II)

where
R$_3$ stands for a hydrogen atom, an alkyl radical which contains 1 to 4 carbon atoms and may be substituted,
R$_4$ for a phenyl radical which may be substituted
and A$_2$ for a benzoxazole or naphthoxazole radical which may be substituted.

The preferred triazolylstyryl compounds of formula (I) have the formula

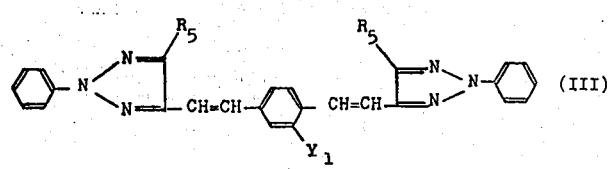 (III)

where
R$_5$ stands for hydrogen or methyl
and Y$_1$ for a hydrogen or chlorine atom, a cyano, carboxyl or lower alkyl group, an optionally substituted but preferably unsubstituted alkoxycarbonyl or aminocarbonyl group, a lower alkylsulphonyl group, a sulphonic acid group, an optionally substituted sulphonic acid alkylester or sulphonic acid phenyl ester group, or an optionally substituted sulphonic acid amide or phenylsulphone group.

The new triazolylstyryl compounds of formula (I) can be synthesized by any one of the several known methods.

One route of synthesis starts from a triazolylaldehyde or formula

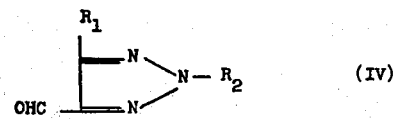 (IV)

or one of its functional derivatives, e.g. an oxime, hydrazone or anile, which is condensed with a substituted toluene of formula

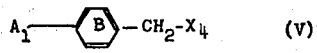 (V)

where
X$_4$ represents hydrogen, cyano, carboxy or $$-P=O\begin{matrix}O\text{-alkyl}\\O\text{-alkyl}\end{matrix},$$

in the presence of a suitable catalyst such as boric acid, zinc chloride, arylsulphonic acids, e.g. benzene- or 4-methylbenzenesulphonic acid, acetic anhydride, alkali acetates, e.g. sodium or potassium acetate, piperidine, the alkali salts or alkaline earth salts of arylsulphonamides, e.g. the sodium, potassium, calcium or barium salts of benzene- or 4-methylbenzenesulphonamide, and the hydroxides or alcoholates of alkalis or alkaline earths, e.g. the sodium, potassium, calcium or barium hydroxides or alcoholates, preferably in the absence of air at temperatures ranging from 0° to 200°C or more specifically at 20° to 160°C. If X$_4$ stands for hydrogen the progress of the reaction is facilitated when the benzene nucleus B bears a negative substituent such as —CN, —COOH, SO$_3$H or an optionally substituted carboxylic acid ester, carboxylic acid amide, sulphonic acid ester or sulphonic acid amide group. On completion of the reaction the group X$_4$, if still present, is split off by a suitable method.

The reaction can be carried out by melting the reactants though it is advisable to add an inert solvent to the melt, such as aliphatic or aromatic, preferably halogenated hydrocarbons, alcohols, ethers, glycols, or formamide, dimethyl formamide, dimethyl acetamide, N-methylpyrrolidone, acetonitrile, dimethylsulphoxide, tetramethylene sulphone or phosphoric acid tris(dimethylamide).

A second method of synthesis consists in the arylation of a compound of formula

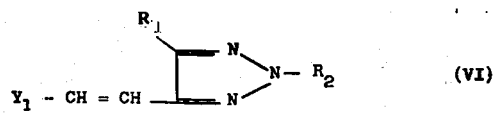 (VI)

where
Y$_2$ represents a negative substituent such as —CO—CH$_3$ or an optionally substituted carboxylic acid ester or carboxylic acid amide group, preferably —COOH or —CN,
with the diazonium salt of an amine of formula

 (VII)

with simultaneous or subsequent cleavage of the substituent Y$_2$ (the Meerwein arylation method; of R. Adams, Organic Reactions, Vol. II, p. 169, New York, 1960).

It is best to effect arylation in an aqueous or aqueous-organic medium, for example water-acetone, water-methanol, water-ethanol, water-isopropanol or water-ethylene glycol, in the temperature range of —10°C to 60°C or preferably at 20°–40°C and in the presence of a copper (I) and/or a copper (II) salt. If necessary a buffer acting in the acid region can be added, such as acetic acid-sodium acetate, monosodium phosphate or monosodium tartrate. A further process or production consists in reacting a compound of formula

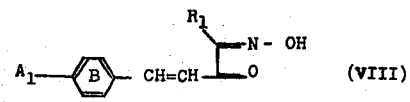 (VIII)

with a hydrazine of formula $$H_2N — HN — R_2$$

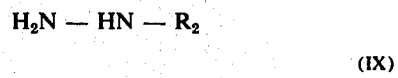 (IX)

and cyclizing the resulting hydrazone to a triazolyl compound of formula (I).

The reaction of the compound of formula (VIII) with the hydrazine of formula (IX) can be conveniently effected in an inert organic, preferably polar solvent, e.g. in one of the solvents suitable for the reaction of the compounds of formulae (IV) and (V), or in a lower alkanecarboxylic acid such as acetic or propionic acid. The reaction is best accomplished at temperatures ranging from 0°C to 100°C, the optimum range being 20°–60°C, and in the presence of an acid, preferably one of the lower organic carboxylic acids such as formic, acetic, propionic, butyric, oxalic, tartaric, lactic or citric acid. The cyclization of the isolated hydrazone can be carried out by treatment with a dehydrating agent, for example one of the anhydrides or halides, preferably the chlorides, of organic carboxylic acids, e.g. acetic or propionic anhydride or chloride, or the halides of phosphoric acids, e.g. phosphorus trichloride, oxychloride or pentachloride, at temperatures from 0°C to 150°C or preferably in the range of 20°C to 130°C. If acid halides are employed inert organic solvents can be used, such as hydrocarbons, halogenated hydrocarbons, ethers, dimethyl formamide, dimethyl acetamide, dimethyl sulphoxide, tetramethylene sulphone. In other cases the reaction can be carried out in a substantial excess of acetic anhydride, if necessary in the presence of a solvent such as dimethyl formamide.

The cyclization reaction yielding the triazole of formula (I) can also be carried out by treatment with urea at temperatures of 100°C to 210°C, preferably at 120°–175°C. In this case it is not necessary to dry the hydrazone prior to reaction. It can be added to the urea melt in the moist state; as the melt is heated up the water evaporates and cyclization takes place. It is of advantage to employ an amount of urea 2 to 20 times, or preferably 3 to 15 times, greater by weight than the dry content of the hydrazone.

The triazolyl compounds obtained by the aforedescribed reactions can be isolated by standard methods, for instance by suction when present in suspension, by precipitation with a suitable agent and filtration with suction, or by evaporation of the solvent and filtration of the precipitated product with suction.

The new triazolylstyryl compounds are suitable for brightening the most varied textiles and plastic products made of organic materials. By "organic materials" are understood natural fibres such as cotton and wool, but more especially fibre-forming polymers such as polyesters, polyamides, polyurethanes, polyolefins (polyethylene, polypropylene), polyvinyl acetate, polyvinyl chloride, polyvinylidene chloride, polyacrylonitrile, modified polyacrylonitrile, cellulose triacetate, secondary cellulose acetate, and polystyrene.

The compounds are applicable by the normal methods, for instance from solution in water or in organic solvent or from aqueous dispersion. Primarily, however, they are incorporated with successful results in spinning solutions and melts, in plastic moulding compounds and in monomers or monomer precondensates for the synthesis of polymers.

Depending on the method of application, the compounds are employed in amounts of 0.001 to 0.5 percent, or more specifically 0.01–0.2 percent, on the weight of the material to be brightened. They can be used alone or in combination with other optical brightening agents and in the presence of bleaching agents and surface active agents such as detergents and carriers.

In the following Examples the parts and percentages are by weight and the temperatures are given in degrees centigrade.

EXAMPLE 1

33 Parts of 4-(6'-phenylbenzoxazolyl-(2')-phenylacetic acid, 20 parts of 4-formyl-2-phenyl-1,2,3-triazole and 5 parts of piperidine are reacted for 2—3 hours at 150°–160° in the absence of air. The melt is then cooled and the solid material is pulverized and treated with 205 parts of 2-normal hydrochloric acid solution. The precipitated product is filtered off with suction, washed with water until neutral and purified by recrystallization from 2-ethoxyethanol.

The compound thus obtained has the formula

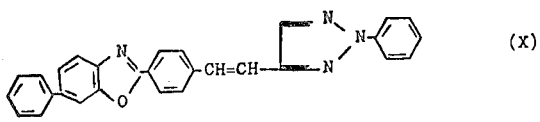

and melts at 225°–226° (uncorrected).

EXAMPLE 2

13 Parts of 2-(4''-methylphenyl)-naptho-(1',2'-d)-oxazole and 12.4 parts of 2-phenyl-1,2,3-triazole-4-aldehydanile are dissolved in 300 parts of dimethyl formamide in the absence of air, with the subsequent addition of 25 parts of finely pulverized potassium hydroxide at room temperature. The reaction mixture is raised to 60° in 30 minutes, held at this temperature for 30 minutes and then cooled to about 10°. 10 Parts of water followed by 250 parts of 10 percent hydrochloric acid are added dropwise, with cooling and supervision to prevent the temperature of the reaction mixture from exceeding 15°. A yellow precipitate forms which is filtered off with suction, washed with water until neutral and treated with methanol in small portions totalling 300 parts. The product is purified by recrystallization from 2-ethoxyethanol and tetrachlorethylene. Its melting point is 234°–235° (uncorrected) and it is of formula

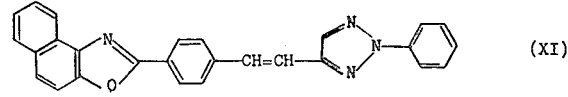

The method of production is in analogy with that described by A. E. Sigrist, Helvetica Chemica Acta 50, 906 (1967).

The identical product is obtained when in place of the 2-phenyl-1,2,4-triazole-4-aldehydanile the corresponding oxime or phenylhydrazone is employed.

EXAMPLE 3

19 Parts of p-xylylene-diphosphonic acid tetraethyl ester and 17.3 parts of 2-phenyl-1,2,3-triazole-4-aldehyde are dissolved in 95 parts of dimethyl formamide. A solution of 2.6 parts of sodium in 16 parts of methanol is dropped in at 40° with vigorous stirring and at a measured rate so that the heat of reaction keeps the mixture at exactly 40°. After the addition it is stirred for a further hour. Then 80 parts of methanol are added and the pH is adjusted to 7 with glacial acetic acid. The crystalline precipitate is filtered off with suction and recrystallized from 2-ethoxyethanol. It is obtained in the form of pale yellow needles with melting point 204°–205° (uncorrected).

The compound is of formula

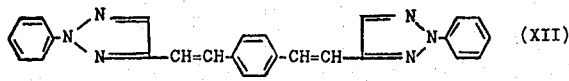 (XII)

EXAMPLE 4

14.3 Parts of 4-amino-2-cyano-β-[2'-phenyl-1',2',3'-triazolyl-(4')]-styrene are diazotized in accordance with Example 14 of German published patent application 1,805,371. The diazo compound is entered into a solution of 10.8 parts of β-[2-phenyl-1,2,3-triazolyl-(4)]-acrylic acid in 396 parts of acetone containing 13 parts of crystallized sodium acetate and 2.1 parts of copper chloride. The reaction mixture is stirred at 20–25 until the evolution of gas has ceased and no further diazonium salt is indicated. The acetone is distilled off and the product filtered. It is recrystallized several times from a mixture of chlorobenzene and 2-ethoxyethanol, on which the compound of formula

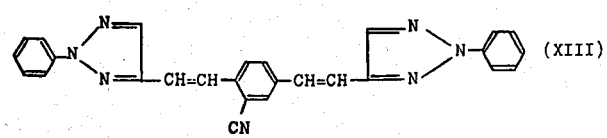 (XIII)

is obtained in form of pale yellow crystals melting at 185°–6° (uncorrected).

If arylation is effected with diazotized 2-(p-aminophenyl)-benzoxazole or 2-(p-aminophenyl)-naphthoxazole the compounds of formula

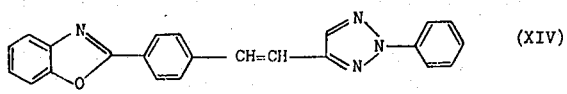 (XIV)

or of formula (XI) respectively are obtained.

The following table contains compounds corresponding to the formula

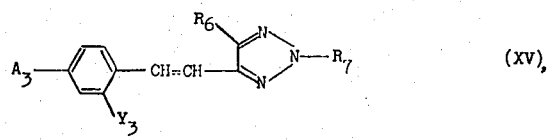 (XV), which can be prepared according to the preceeding examples and are well suitable for the optical brightening of hydrophobic synthetic materials.

In the following Table polyester denotes the fibre made from polyethylene terephthalate or from the condensation product of terephthalic acid and 1,4-dimethylol-cyclohexane.

TABLE

| Ex. No. | $A_3$ | $Y_3$ | $R_6$ | $R_7$ | Brightened Material |
|---|---|---|---|---|---|
| 5 | naphthoxazolyl | H | H | Phenyl | Polystyrene |
| 6 | do. | H | $CH_3$ | do. | Polyester |
| 7 | do. | H | H | 4-Methyl-phenyl | do. |
| 8 | benzoxazolyl | H | $CH_3$ | Phenyl | do. |
| 9 | do. | H | Phenyl | do. | do. |
| 10 | do. | H | H | 4-Chlorophenyl | do. |
| 11 | naphthoxazolyl | H | H | Phenyl | do. |
| 12 | methyl-benzoxazolyl | H | H | do. | do. |
| 13 | benzoxazolyl | H | H | 4-Methyl-phenyl | do. |
| 14 | chloro-benzoxazolyl | H | H | Phenyl | do. |

TABLE — Continued

| Ex. No. | $A_3$ | $Y_3$ | $R_6$ | $R_7$ | Brightened Material |
|---|---|---|---|---|---|
| 15 | t-$C_4H_9$-benzoxazolyl-CH$_3$ | H | H | do. | do. |
| 16 | do. | H | H | 3-Chlorophenyl | do. |
| 17 | do. | H | H | 2,4-Dimethylphenyl | Polypropylene |
| 18 | t-$C_5H_{11}$-benzoxazolyl-CH$_3$ | H | H | Phenyl | do. |
| 19 | phenyl-pyrazolyl-CH=CH- | —CONH$_2$ | H | do. | Polyester |
| 20 | do. | —COOH | H | do. | do. |
| 21 | do. | Cl | H | do. | do. |
| 22 | do. | —SO$_2$-phenyl | H | do. | do. |
| 23 | phenyl-(CH$_3$)pyrazolyl-CH=CH- | H | CH$_2$ | do. | do. |

APPLICATION EXAMPLE A

Two parts of the compound of formula (X), 2 parts of a highly sulphonated castor oil and 8 parts of sodium dioctylphenylpolyglycolether oxyacetate bearing 40 ethenoxy groups in the molecule are dispersed in 80 parts of water. The dispersion is ground in a sand mill or other suitable equipment until the major proportion of the particles are 0.5–2 microns in size.

A bath is prepared at 50° with 2 parts of this dispersion, 15 parts of a commercial carrier, e.g. orthodichlorobenzene, and 3000 parts of water. 100 Parts of a fabric of polyester fibre (polyethylene terephthalate) are entered, the bath is raised to the boil in 30 minutes and the fabric treated at the boil for 45 minutes with reflux. On removal it is treated in an aqueous bath of 1.5 g/l octylphenyldecaglycol ether for 10 minutes at 70° and liquor ratio 40:1, rinsed with warm water and dried. Pronounced brightening is shown by the fabric. If the treatment is carried out in enclosed equipment at 120°–130° comparable white effects are obtained without the addition of a carrier.

APPLICATION EXAMPLE B

A fabric of polyester fibre, e.g. of the polyethylene terephthalate type, is padded at room temperature with a solution containing, per 1000 parts of water, 20 parts of a dispersion prepared as in Application Example A with the compound of formula (XI), uncorrected melting point 234°–235°, as active substance. On the padding machine it is expressed to retain 80 percent of its weight of the liquor, and afterwards is dried for 30 minutes at 60° and exposed to dry air at 220° for 1 minute. Intense brightening of the fabric is obtained. This method of application can be employed with equal success to brighten piece goods of a polyester fibre synthesized by condensation of terephthalic acid and 1,4-dimethylol-cyclohexane.

APPLICATION EXAMPLE C

100 Parts of a polyester fabric, e.g. of polyethylene terephthalate, are treated for 90 minutes in a bath of 90°–95° consisting of 3000 parts of water, 6 parts of 85 percent formic acid, 6 parts of 80 percent sodium chlorite, 15 parts of a carrier containing 5 parts of a trichlorobenzene mixture, and 2 parts of a dispersion prepared as in Application Example A with the compound of formula (XII) as active substance. On removal the fabric is washed, rinsed and dried. It shows a higher degree of whiteness than a comparable fabric treated under the same conditions without the addition of an optical brightener.

If in place of the compound (XII), the compound of formula (XIII) is used, a still better brightening effect is obtained.

APPLICATION EXAMPLE D

100 Parts of polypropylene in granule form are powdered with 0.01 part of the compound

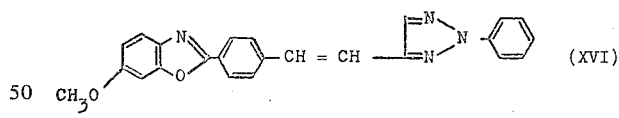

(XVI)

(melting point 191°–195°) in a mixer. The granules are melted on a roller mill at 144°–220° and the melted mass is either processed as flat panels or regranulated and moulded into the final shape. The articles thus produced show a clearly superior degree of whiteness. The polypropylene can be replaced by high- or low-pressure polyethylene, another polyolefin, polystyrene or cellulose acetate.

The compound of formula (XVI) used in this Example can be produced by a process analogous to the anile synthesis [of. A. E. Siegrist, Helvetica Chimica Acta 50, 906–957 (1967)].

Having thus disclosed the invention, what we claim is:

1. A triazolyl compound of formula

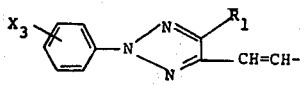

where
R₁ stands for hydrogen; alkyl with 1–6 carbon atoms, which may bear as substituents hydroxy, halogen or alkoxy with 1–6 carbon atoms; or phenyl, which may bear as substituents halogen, nitrile, alkyl or alkoxy with 1–6 carbon atoms, phenyl, the sulphonic or carboxylic group or the sulphonic or carboxylic amide group, R₂ stands for a phenyl or naphthyl radical, which may be substituted, X₃ stands for hydrogen, halogen or alkyl or alkoxy with 1–6 carbon atoms and the ring B may bear a substituent, provided that the substituents of the ring B and of phenyl radicals occurring in R₂ are alkyl or alkoxy with 1–6 carbon atoms; halogen; nitrile; unsubstituted or substituted phenyl or phenoxy; carboxylic or sulphonic acid; carboxylic or sulphonic acid phenyl, substituted phenyl or optionally substituted alkyl (C₁₋₆) ester; carboxylic or sulphonic acid amide; optionally substituted phenylsulphonyl; or alkylsulphonyl with 1–6 carbon atoms; where alkyl may bear as substituents hydroxy, halogen or alkoxy with 1–6 carbon atoms and phenyl and phenoxy may bear as substituents alkyl (C₁₋₆), alkoxy (C₁₋₆) or halogen; and wherein the amides are derived from amines of formula

where
R' stands for hydrogen, alkyl with 1–6 carbon atoms, hydroxyalkyl with 2–4 carbon atoms, alkoxyalkyl with 3–6 carbon atoms, phenyl, methylphenyl, halogenphenyl, methoxyphenyl or phenylalkyl where alkyl is of 1–6 carbon atoms and R" stands for hydrogen, alkyl with 1–6 carbon atoms or hydroxyalkyl with 2–4 carbon atoms.

2. A triazolyl compound according to claim 1 of formula (I) wherein R₁ stands for phenyl, linear alkyl or hydrogen.

3. A triazolyl compound according to claim 1 of formula

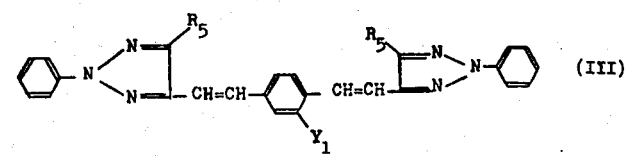 (III)

where
R₅ stands for hydrogen or methyl
and Y₁ for a hydrogen or chlorine atom, a cyano, carboxyl or lower alkyl group, an optionally substituted but preferably unsubstituted alkoxycarbonyl or aminocarbonyl group, a lower alkylsulphonyl group, a sulphonic acid group, an optionally substituted sulphonic acid alkylester or sulphonic acid phenyl ester group, or an optionally substituted sulphonic acid amide or phenylsulphone group.

4. A triazolylstyryl compound of formula

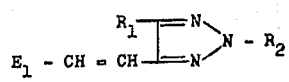

wherein
R₁ is hydrogen, lower alkyl or phenyl,
R₂ is unsubstituted phenyl or phenyl substituted by halogen, lower alkyl, lower alkoxy or aminosulfonyl,
E₁ is

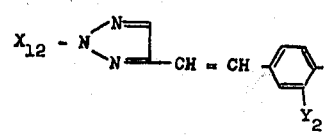

X₁₂ is phenyl,
and Y₂ is hydrogen, chlorine, cyano, lower alkyl, lower alkylsulfonyl, lower alkoxysulfonyl, lower alkoxycarbonyl, phenoxysulfonyl, aminocarbonyl, aminosulfonyl, carboxyl or SO₃H.

5. A triazolylstyryl compound according to claim 4 of the formula

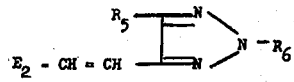

wherein
R₅ is hydrogen, methyl or phenyl,
R₆ is phenyl, methylphenyl, dimethylphenyl, methoxyphenyl, methylmethoxyphenyl, chlorophenyl, dichlorophenyl or aminosulfonylphenyl,
E₂ is

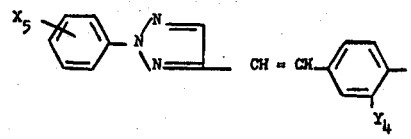

wherein
Y₄ is hydrogen, chlorine or cyano, and
X₅ is hydrogen, chlorine, bromine, fluorine or alkyl or alkoxy having 1 to 6 carbon atoms.

6. The triazolylstyryl compound according to claim 4 of formula

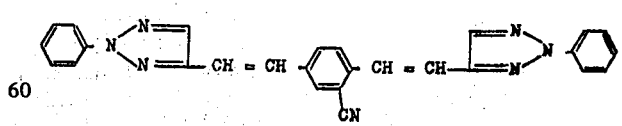

7. The triazolylstyryl compound according to claim 1 and of the formula

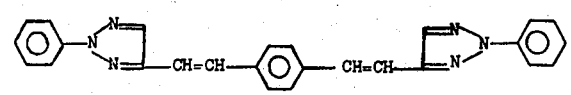

8. The triazolylstyryl compound according to claim 1 and of the formula
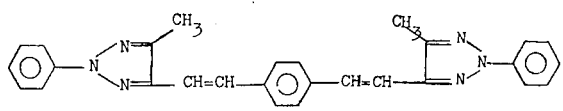
9. The triazolylstyryl compound according to claim 1 and of the formula
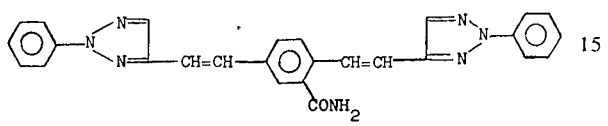
10. The triazolylstyryl compound according to claim 1 and of the formula
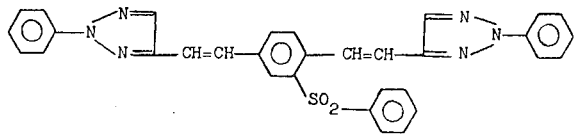
11. The triazolylstyryl compound according to claim 1 and of the formula
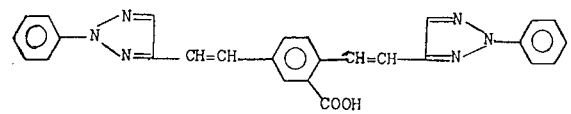
12. The triazolylstyryl compound according to claim 1 and of the formula
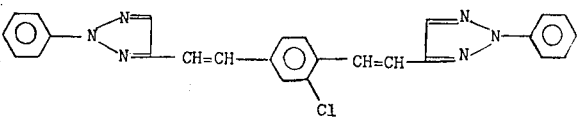
* * * * *

UNITED STATES PATENT AND TRADEMARK OFFICE
CERTIFICATE OF CORRECTION

PATENT NO. : 3,891,632
DATED : June 24, 1975
INVENTOR(S) : Fritz Fleck and Hans Rudolf Schmid It is certified that error appears in the above-identified patent and that said Letters Patent are hereby corrected as shown below:

In the first line of column 11, the formula should read:

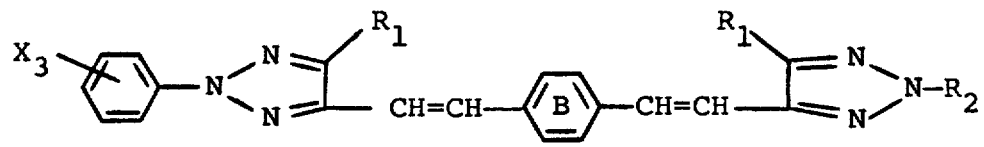

Signed and Sealed this

Sixteenth Day of January 1979

[SEAL]

Attest:

RUTH C. MASON
Attesting Officer

DONALD W. BANNER
Commissioner of Patents and Trademarks